US011899436B2

(12) United States Patent
Fischer

(10) Patent No.: US 11,899,436 B2
(45) Date of Patent: Feb. 13, 2024

(54) MANUFACTURING SYSTEM AND METHOD FOR NESTING SUB-SPACES FOR CONTROL OF A CUTTING PROCESS

(71) Applicant: TRUMPF Werkzeugmaschinen GmbH + Co. KG, Ditzingen (DE)

(72) Inventor: Stephan Fischer, Karlsruhe (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 254 days.

(21) Appl. No.: 17/231,212

(22) Filed: Apr. 15, 2021

(65) Prior Publication Data
US 2021/0232129 A1    Jul. 29, 2021

Related U.S. Application Data

(63) Continuation of application No. PCT/EP2019/077162, filed on Oct. 8, 2019.

(30) Foreign Application Priority Data

Oct. 19, 2018  (DE) .......................... 102018126069.5

(51) Int. Cl.
    *G05B 19/418*    (2006.01)
(52) U.S. Cl.
    CPC . *G05B 19/41885* (2013.01); *G05B 19/41815* (2013.01); *G05B 19/41865* (2013.01)
(58) Field of Classification Search
    CPC ........ G05B 19/41885; G05B 19/41815; G05B 19/41865; G05B 19/4097;
    (Continued)

(56) References Cited

U.S. PATENT DOCUMENTS 5,748,762 A     5/1998  Guez
7,089,082 B1 *  8/2006  Lukis ................. G05B 19/4097
                                                700/197
(Continued)

FOREIGN PATENT DOCUMENTS

CN       105740953      7/2016
CN       206747802     12/2017
(Continued)

OTHER PUBLICATIONS

Bennell et al., "The geometry of nesting problems: A tutorial," European Journal of Operational Research, Jan. 16, 2008, 184(2):397-415.
(Continued)

*Primary Examiner* — Christopher E. Everett
(74) *Attorney, Agent, or Firm* — Fish & Richardson P.C.

(57) ABSTRACT

The present disclosure relates to nesting sub-spaces for a machine tool by reading in evaluation criteria for an arrangement of nested sub-spaces, generating sequence data for an arrangement of nested sub-spaces, repeatedly performing a process until the result data exceeds a specified range. The process includes: generating evaluation data by evaluating the sequence data with an evaluation algorithm, generating result data based on a combinatorial logic of the evaluation data with the evaluation criteria, generating calculation data from the sequence data, the evaluation data, and the result data using the evaluation algorithm, generating further sequence data taking into account the calculation data with the evaluation algorithm, and repeating the process until the result data exceeds a specified range. The calculation data acts onto the generation of new sequence data to improve an arrangement of nested sub-spaces with respect to evaluation criteria.

19 Claims, 2 Drawing Sheets

(58) Field of Classification Search
CPC ........... G05B 2219/35162; G05B 2219/36199; G06Q 10/043; B23K 26/38; B23K 37/0408; Y02P 80/40

See application file for complete search history.

(56) References Cited

U.S. PATENT DOCUMENTS

| | | | |
|---|---|---|---|
| 8,455,787 | B2 | 6/2013 | Takada |
| 9,031,688 | B2 | 5/2015 | Himeno et al. |
| 2002/0072824 | A1 | 6/2002 | Susnjara |
| 2004/0016731 | A1 | 1/2004 | Erlenmaier |
| 2005/0122346 | A1 | 6/2005 | Horn |
| 2007/0270996 | A1 | 11/2007 | Roise |
| 2009/0139078 | A1* | 6/2009 | Fruth ............... G05B 19/4188 700/95 |
| 2010/0064870 | A1 | 3/2010 | Olsen |
| 2012/0109352 | A1 | 5/2012 | Himeno et al. |
| 2013/0144425 | A1* | 6/2013 | Chu ............... G05B 19/4097 700/184 |
| 2014/0005804 | A1* | 1/2014 | Brand ............... G05B 19/31 700/63 |
| 2017/0024497 | A1 | 1/2017 | Wentao et al. |
| 2017/0115656 | A1 | 4/2017 | Ottnad et al. |
| 2017/0305067 | A1* | 10/2017 | Cortes ............... B29C 64/153 |

FOREIGN PATENT DOCUMENTS

| | | |
|---|---|---|
| DE | 102012212566 | 1/2014 |
| DE | 102014213518 | 1/2016 |
| DE | 102018124146 | 4/2020 |
| DE | 102018126077 | 4/2020 |
| EP | 1340584 | 9/2003 |
| EP | 2029313 | 3/2009 |
| EP | 2029314 | 3/2009 |
| EP | 2029316 | 3/2009 |
| EP | 2441547 | 4/2012 |
| JP | H 07299682 | 11/1995 |
| JP | H 09271977 | 10/1997 |
| WO | WO 2005/047998 | 5/2005 |
| WO | WO 2020/064877 | 4/2020 |
| WO | WO 2020/079221 | 4/2020 |

OTHER PUBLICATIONS

Bystronic.com, "More Safety in the Laser Cutting Process," Feb. 1, 2019, retrieved May 10, 2021 from URL <https://www.bystronic.com/en/news/innovation/Tilt-Prevention.php>, 4 pages.

DE Office Action in German Appln. No. DE 10 2018 126 069, dated May 17, 2019, 4 pages (with English translation).

Dewil et al., "A review of cutting path algorithms for laser cutters," The International Journal of Advanced Manufacturing Technology, Nov. 2016, 87(5):1865-84.

Dowsland et al., "An algorithm for polygon placement using a bottom-left strategy," European Journal of Operational Research, Sep. 1, 2002, 141(2):371-81.

Egeblad et al., "Fast neighborhood search for two-and three-dimensional nesting problems," European Journal of Operational Research, Dec. 16, 2007, 183(3):1249-66.

Francis et al., "State of the Art of Nesting," International Research Journal of Engineering and Technology, Jun. 2017, 4(6), 9 pages.

Hopper, "Two-dimensional packing utilising evolutionary algorithms and other meta-heuristic methods," Doctoral dissertation, University of Wales, Cardiff, May 2000, 80 pages.

Junior et al., "A hybrid methodology for nesting irregular shapes: Case study on a textile industry," IFAC Proceedings Volumes, Sep. 1, 2013, 46(24):15-20.

Liu et al., "Algorithm for 2D irregular-shaped nesting problem based on the NFP algorithm and lowest-gravity-center principle," Journal of Zhejiang University—Science A, Apr. 2006, 7(4):570-6.

PCT International Search Report and Written Opinion in International Appln. No. PCT/EP2019/077162, dated Jan. 27, 2020, 10 pages.

Poshyanonda et al., "Genetic neuro-nester," Journal of Intelligent Manufacturing, Apr. 2004, 15(2):201-18.

Poshyanonda et al., "Two dimensional nesting problem: artificial neural network and optimization approach," Proceedings of the International Joint Conference of Neural Networks, Jun. 7, 1992, IV-572, 6 pages.

ProNest 8.0 User Manual, Oct. 1, 2006, 146 pages.

Rao et al., "An improved hierarchical genetic algorithm for sheet cutting scheduling with process constraints," The Scientific World Journal, Jan. 1, 2013, vol. 2013.

Ratanapan et al., "An object-based evolutionary algorithm for solving nesting problems," International Journal of Production Research, Feb. 15, 2007, 45(4):845-69.

Sherif et al., "Sequential optimization approach for nesting and cutting sequence in laser cutting," Journal of Manufacturing Systems, Oct. 1, 2014, 33(4):624-38.

Struckmeier et al.. "Nesting in the sheet metal industry: Dealing with constraints of flatbed laser-cutting machines," Procedia Manufacturing, Jan. 1, 2019, 29:575-82.

Wodziak et al., "A genetic algorithm for optimizing multiple part placement to reduce build time," Proceedings of the Fifth International Conference on Rapid Prototyping, Jun. 12, 1994, 12:201-210.

Xie et al., "Nesting of two-dimensional irregular parts: an integrated approach," International Journal of Computer Integrated Manufacturing, Dec. 1, 2007, 20(8):741-56.

Anand et al., "Heuristic and genetic approach for nesting of two-dimensional rectangular shaped parts with common cutting edge concept for laser cutting and profile blanking processes," Computers & Industrial Engineering, Feb. 2015, 80:111-24.

EP Office Action in European Appln. No. 19786312.9, dated Sep. 18, 2023, 26 pages (with English translation).

\* cited by examiner

MANUFACTURING SYSTEM AND METHOD FOR NESTING SUB-SPACES FOR CONTROL OF A CUTTING PROCESS

CROSS REFERENCE TO RELATED APPLICATIONS

This application is a continuation of and claims priority under 35 U.S.C. § 120 from PCT Application No. PCT/EP2019/077162, filed on Oct. 8, 2019, which claims priority from German Application No. 10 2018 126 069.5, filed on Oct. 19, 2018. The entire contents of each of these priority applications are incorporated herein by reference.

TECHNICAL FIELD

The present disclosure generally relates to nesting of workpieces to be cut by a flatbed machine tool on an starting sheet, and in particular to methods for nesting workpieces corresponding to sub-spaces for control of a cutting process of a flatbed machine tool, e.g., a flatbed laser cutting machine tool. Furthermore, the disclosure relates to manufacturing systems with a flatbed machine tool.

BACKGROUND

A nesting herein refers to the positioning of workpieces on a raw material sheet (e.g., the starting sheet of a laser cutting process). In the sheet metal processing industry, nesting of workpieces, which are to be cut on a raw material sheet, is part of the production process, wherein the nesting results in a specific layout of cutting lines. Herein, the result of a nesting procedure (the nesting) in the planning and cutting phase is also called a nesting plan, according to which the workpieces defined therein are cut along cutting lines from the raw material sheet.

When planning laser cutting processes, geometric nesting can be performed first. For the nesting, quality parameters such as, for example, a residual material bar width, i.e., the width of material that should remain as residual material at least between two workpieces) can be specified. Based on the calculated geometric nesting, it is then possible to determine for this calculated geometric nesting and for a processing head, which delivers the laser beam, a travel sequence with respect to the workpieces to be cut out, the travel sequence being in particular as good as possible. However, it was recognized that all known nesting results can always be further improved and the existing methods could not always derive the best nesting.

SUMMARY

An aspect of the present disclosure is based on the objective to provide an improved nesting process for workpieces to be cut. A further aspect of the present disclosure is based on the objective of improving process efficiency, in particular, a material efficiency and/or time efficiency, for a cutting process based on a correspondingly nested arrangement of sub-spaces and a travel path underlying the nesting, the travel path including the contours of the sub-spaces and the connecting paths between the contours of the sub-spaces.

An aspect of the present disclosure relates to methods for nesting sub-spaces, wherein the sub-spaces are arranged in a two-dimensional planning space and are delimited by contour lines in the two-dimensional planning space, and wherein a sub-space is provided for controlling a cutting process of a flatbed machine tool for cutting a workpiece from a material sheet along at least one cutting line corresponding to a contour line of the sub-space. The methods include the steps of:

a. reading in evaluation criteria for an arrangement of nested sub-spaces;
b. generating sequence data for an arrangement of nested sub-spaces;
c. generating evaluation data by evaluating the sequence data with an evaluation algorithm;
d. generating result data based on a combinatorial logic of the evaluation data with the evaluation criteria;
e. generating calculation data from the sequence data, the evaluation data, and the result data using the evaluation algorithm;
f. generating further sequence data taking into account the calculation data with the evaluation algorithm; and
g. repeating steps c. to f. until the result data exceeds a specified range.

In this regard, the evaluation algorithm executes at least one data aggregation routine when generating evaluation data, calculation data, and/or other sequence data. The data aggregation routine, when activated, aggregates a plurality of input data into output data. The input data includes at least two of the following data types:

the sequence data read in by the evaluation algorithm,
the evaluation data generated by the evaluation algorithm,
the calculation data generated by the evaluation algorithm,
the output data of another data aggregation routine, and
the output data of the same data aggregation routine that was executed before.

The output data affect at least one of the following data types:

the sequence data generated by the evaluation algorithm,
the evaluation data generated by the evaluation algorithm, and
the calculation data generated by the evaluation algorithm.

In another aspect, the disclosure relates to manufacturing systems that include a flatbed machine tool for cutting workpieces according to workpiece-specific cutting contours from a material sheet, and a remote data processing system, and/or a local manufacturing control system. These system elements are configured to perform the previously outlined methods to determine an arrangement of sub-spaces. These system elements are further configured to output the arrangement of sub-spaces as a control signal to the flatbed machine tool for cutting workpieces corresponding to the sub-spaces from the material sheet.

In some embodiments, the evaluation criteria can be at least partially specified by a user. Alternatively or additionally, the evaluation criteria can be specified at least partly by a control system, e.g., a higher-level control system. The evaluation criteria can include variables associated with the arrangement of sub-spaces. The variables can characterize an overlap of sub-spaces, relative angles of sections of the contour lines that may trigger a beam stop during the cutting process, and/or a time duration allocated to the cutting process, in particular taking into account heat effects. The evaluation data can represent evaluations of the variables associated with the evaluation criteria.

The processes and systems disclosed herein can enhance improvement parameters such as material efficiency, order throughput time, and quality in a more flexible manner than before. In particular, they have a high flexibility in adapting to different nesting approaches.

In some embodiments, the result data includes data defining an improvement parameter, particularly a material efficiency of the arrangement of sub-spaces, and a quality of workpiece generation. A combinatorial logic can include steps of performing a comparison, difference formation, ratio formation, and/or correlation formation of the evaluation data with the evaluation criteria.

In some embodiments, an evaluation algorithm can include one or more data aggregation routines. The evaluation algorithm can be designed to activate the data aggregation routine or routines multiple times, e.g., more than ten times, e.g., more than a hundred times, e.g., more than a thousand times, e.g., more than ten thousand times, and in doing so, assign at least once output data of another data aggregation routine or the same data aggregation routine, which was previously executed as input data to the data aggregation routine. The evaluation algorithm can be further adapted to always activate the data aggregation routine or routines with calculation data and one of the other data types as input data. Further, the data aggregation routine can be designed to link, in particular multiply, the calculation data with one of the other input data.

In some embodiments, the calculation data are associated with certain input data of the data aggregation routines. The calculation data can be linked to them, in particular multiplied. The calculation data can include data adapted to improve the arrangement of nested sub-spaces, e.g., the associated evaluation data and/or result data. For example, the calculation data can include data allowing one to determine which input data have an effect, in particular as positive as possible, on the result data and/or the evaluation data. In particular, the calculation data assigned thereto can then be set such that the linking, e.g., multiplications, of the calculation data assigned to the input data causes the output data to influence the result, in particular as positively as possible, whereby the result can be successively improved. Optionally, an influence of the calculation data on other evaluation data and/or the result data can be determined.

Particularly advantageously, the methods and/or the devices can/can be used in an industrial production with a computer-based manufacturing control system for processing flat, e.g., bending-resistant objects, e.g., sheet metal parts. For such objects, such nesting methods are particularly advantageous, because the evaluation may depend on very many criteria. The criteria can partially influence each other and can therefore be calculated only within an automated determination with great effort. Examples of such bending-resistant objects are sheets made of metal, glass, plastic, coated materials such as coated panels made of plastic, wood, metal, glass, etc.

Particularly advantageously, the methods and/or the devices can be used in an industrial production with a laser processing machine tool, e.g., a laser cutting machine tool.

It is particularly advantageous if the manufacturing control system is also based at least partly on a remote (offside) data processing system. Then parameters, e.g., the weighted variables, can be used to modify, in particular improve, the algorithms from a first manufacturing site also in other manufacturing sites and vice versa. Thus, a much larger database is available and the nesting results for each individual manufacturing site can be significantly improved.

DETAILED DESCRIPTION

Figure 1:
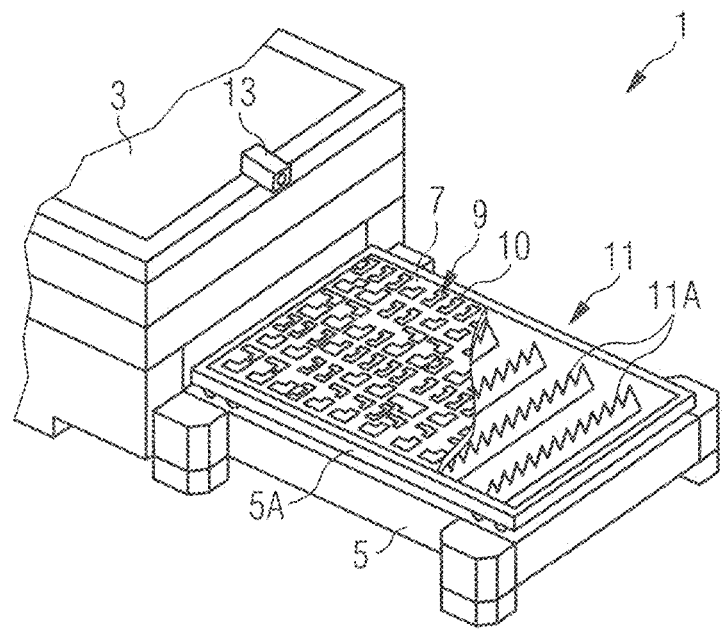
FIG. 1 is a schematic spatial representation of a flatbed machine tool as described herein.

Two-dimensional (2D) nesting problems described herein can be solved, especially for flatbed laser cutting machine tools, in terms of reducing the raw material to be used, because the raw material usually accounts for a significant portion of the total cost. However, other aspects can also be taken into account. For example, in flatbed laser machine tools, the relative positions of the generated workpieces with respect to support bars of the laser cutting machine tool can be taken into account in methods. This is disclosed, for example, in DE 10 2018 124 146 A1 and DE 10 2018 126 077 A1. The mentioned German patent applications are incorporated herein by reference in their entireties.

Furthermore, a collision check can be carried out between the course of the cutting line and support point tips, e.g., as disclosed in the European Patent EP 2 029 313 B1. Furthermore, a workpiece support with positionable support point tips, as disclosed in the European Patent EP 2 029 316 B1, can take place.

Nesting approaches, as revealed in "The geometry of nesting problems: A tutorial", by J. A. Bennell et. Al., European Journal of Operational Research 184 (2008) 397-415, can be used.

With a calculated geometric nesting, a travel sequence, e.g., one that is as good as possible, can be determined with respect to the workpieces to be cut, whereby improvements can be made, for example, with Traveling-Salesman-approaches.

Aspects described herein are based partly on the realization that, when nesting sub-spaces in the planning space (corresponding to arranging workpieces on a plate from which the workpieces are to be cut), the efficiency of the underlying cutting process can enter into the evaluation process, and in particular into the generation of new nestings or underlying sequences of sub-spaces. The process can be continued until criteria such as material efficiency are reached.

Thus, with the methods proposed herein, round-tripping between nesting of sub-spaces and an improvement in the cutting process, such as an improvement of the travel path, can be implemented in the evaluation. Here, travel path refers to the path that the laser head travels relative to the material sheet between cutting processes. This can be done, for example, as follows:

In a first step, a nesting result is generated, wherein instructions for the arrangement of the workpieces (e.g., bottom-left placement) are already applied to create initial nesting results with sufficient quality. In the first step, configuration parameters such as residual material bar width, i.e., the width of material that at least should remain as residual material between two workpieces, can be included; however, this is optional. In a second step, the quality of a nesting result is evaluated. Here, for example, reference points of the sub-spaces, such as incision points or pressure points, can represent initial data that can be used in the evaluation of the travel path. The reference points can be represented, for example, as part of a polygonal chain or polygon-like course to illustrate the cutting process. Consideration can also be given, for example, to overlaps of sub-spaces/workpieces, angles at which a beam stop is to be expected during a cutting process, or the amount of time that would be required for laser cutting, taking into account heat effects. The evaluation result is used to generate a new nesting. An evaluation is then performed again and the process continues until the specified parameters, such as material efficiency and quality of the cut, are met.

Figure 2:
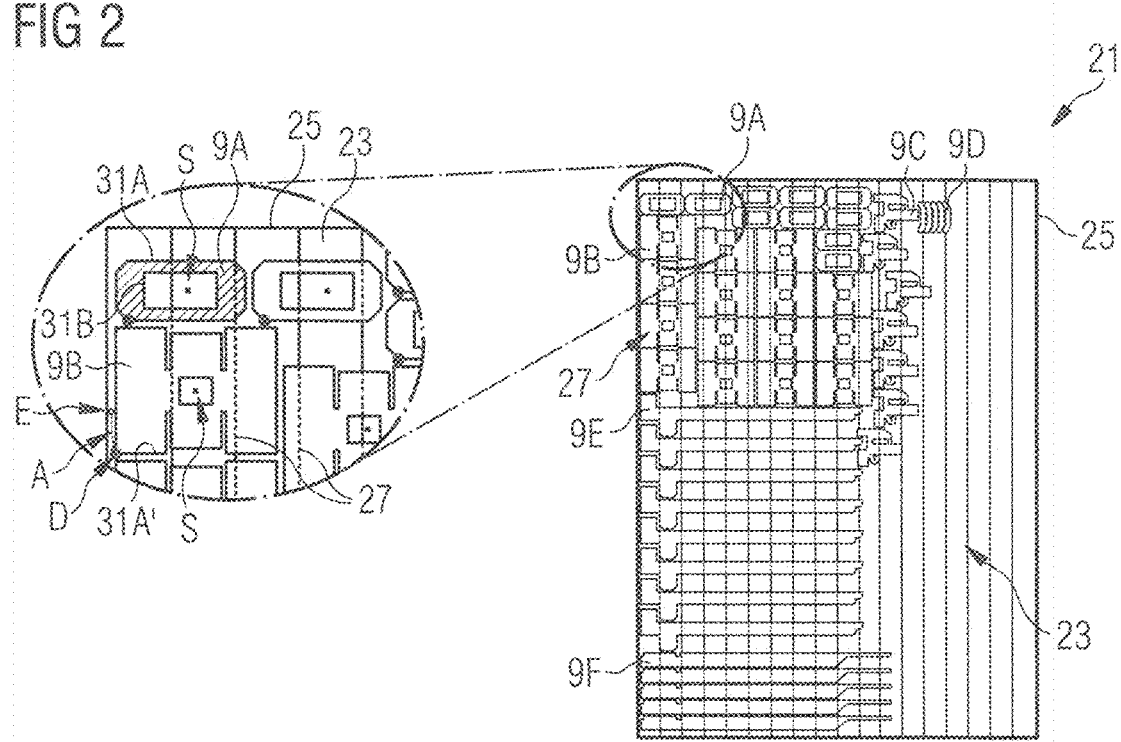
FIG. 2 is a schematic representation of a nesting plan as described herein.

In the following, the generation of workpieces with a flatbed laser cutting machine tool is first explained and this generation is brought into relation with nesting plans (FIGS. 1 and 2). A method for generating a nesting plan is then described in connection with FIG. 3.

A schematic flatbed machine tool 1 shown in FIG. 1 includes a main housing 3 in which the cutting process is performed with a laser beam. In particular, a focus of the laser beam is guided by a control system along predetermined cutting lines arranged in a processing area over a material in order to cut workpieces with specific shapes from, for example, a substantially two-dimensionally extending sheet metal.

Furthermore, the flatbed machine tool 1 includes a pallet changer 5. The pallet changer 5 is configured to position one or more pallets during manufacture. On a pallet 5A, a material sheet to be cut (as raw material or starting material) can be supported and introduced into the main housing 3 for the cutting operation. After the cutting process is completed, the pallet 5A can be moved out of the main housing 3 with a cut material sheet 7, as shown in FIG. 1, so that the cut workpieces 9 can be picked.

In the main housing 3, the laser processing head from which the laser beam emerges can be freely positioned in the processing area so that the laser beam can be guided essentially along any two-dimensional cutting lines over the material sheet to be cut. During laser cutting, the laser beam heats the metal along the cutting line until it melts. A jet of gas, usually nitrogen or oxygen, exits the laser processing head usually in the area of the laser beam and forces the molten material down and out of the gap that forms. The material sheet 7 is thus completely severed by the laser beam during cutting.

To cut out a workpiece 9, the laser beam is moved along a cutting line 10. The cutting line 10 usually starts at an incision point E (see FIG. 2), which can be located outside the workpiece 9, and then approaches the contour of the workpiece 9, e.g., in an arc (the so-called initial cutting A). The point where the cutting line first touches the contour of the workpiece is the point where the cut is later completed (assuming a continuous cutting process). This point is called the pressure point D because it is the point at which the exiting gas jet exerts a pressure on the cut piece; specifically, at the point in time, when the piece is free to move for the first time. Particularly in the case of thin material sheets, the gas pressure can cause the workpiece to tilt, potentially causing a portion of the workpiece to protrude out of the plane of the metal sheet and collide with the cutting head, for example.

Incision point E and pressure point D represent reference points of a sub-space in the planning space.

In the embodiment shown, the pallet 5A has several support bars 11 running transverse to the intake-direction and aligned parallel to each other. By way of example, the support bars 11 have a spacing of 20 mm to 100 mm, for example, 60 mm from one another. The support bars 11 form supporting areas 11A on which the material sheet 7 is deposited. The supporting areas 11A usually form grid points, which may have a spacing of 5 mm to 50 mm, for example, 15 mm along the support bars 11. A support bar has a thickness of 1 mm to 5 mm, for example, 2 mm. The supporting areas 11A thus form a grid of areas that can influence the cutting process of the material sheet 7, which lies on the supporting areas 11A. The areas of the support bars, which influence the cutting process, can moreover extend to areas, which directly adjoin the supporting areas that are in contact with the material sheet, e.g., the flanks of the support bars 11 leading to the supporting areas 11A.

The support bars 11 and, for example, the supporting areas 11A can be taken into account when arranging sub-spaces 9A-9F (corresponding to the workpieces 9) in a planning space 23 (corresponding to the material sheet 7), for example, to increase the quality of cut workpieces 9 or to reduce damage to the support bars 11.

FIG. 1 further shows a camera 13 arranged, for example, on the main housing 3. The camera 13 can be configured, inter alia, for image acquisition of the pallet 5A, the support bars 11 and supporting areas 11A, as well as the relative position of the material sheet 7 with respect to the pallet 5A (and possibly the support bars 11 and supporting areas 11A). The camera 13 is in connection with an image evaluation unit of the control system of the flatbed machine tool 1.

The flatbed machine tool 1 may have a local and/or cloud-based manufacturing control system for performing the methods described herein. The manufacturing control system can be used to generate the evaluations and nesting plans in real time during operation of the flatbed machine tool 1. As a result, the flatbed machine tool can be provided with, for example, a nesting plan that is improved with respect to a cutting process, e.g., shortly after the material sheet is placed.

Herein, "cloud-based" and "remote data processing system" means a storage and/or data processing device, e.g., one that is remote, preferably anonymized, in which data and evaluations from more than one, advantageously from several hundred or several thousand different users can be stored and/or computationally processed. This allows different users to contribute to the improvement of the process regardless of the manufacturing location. It has been recognized that the methods described achieve great success only when several hundred, e.g., several thousand, e.g., ten thousand, e.g., several hundred thousand user evaluations have been read out. Such a quantity of data is often not achievable for a single manufacturing plant in one year. Accordingly, the method would presumably have remained uninteresting for such a manufacturing site under certain circumstances.

One sees that cutting paths above bars or tilting a workpiece 9 can cause damage to the support bar 11 and/or the workpiece 9 and/or a cutting head, thereby increasing the risk of rejected pieces and downtime. Furthermore, damage to the support bars 11 leads to higher service costs for replacement or longer downtimes. Furthermore, in the case of removal of the support bar 11 in the supporting area 11A, the number of supporting points may be reduced, which may increase the risk of tilting of the workpieces 9. If the cutting line 10 runs in the vicinity of a supporting area 11A, there is an increased risk of a reduction in the quality of, for example, the underside of the workpiece. Also, the cutting process may stop if molten material cannot be sufficiently blown out of the gap and thus a workpiece is not completely cut off, each of which may result in more reject pieces.

Thus, one objective of the nesting methods described herein is also to propose an arrangement of sub-spaces 9A-9F in the planning space 23 (corresponding to the workpieces 9 in the material sheet 7), which reduces the risks listed above and possible add-on costs due to, for example, reject pieces as well as service and breakdown of the flatbed machine tool.

FIG. 2 shows a nesting plan 21 (generally an arrangement of sub-spaces 9A-9F) as it can be generated with an arrangement rule in a two-dimensional planning space 23 using an algorithm. This can be a bottom (main direction)-left (secondary direction) arrangement rule. The main direction runs from right to left and the secondary direction from top to bottom in FIG. 2. The planning space 23 is set up in the area of a planning sheet 25. The planning sheet 25 is transferred to the material sheet 7 for the cutting process in such a manner that corresponding geometry data of the planning space 23 corresponds to the machining area provided by the flat bed machine tool 1 for a material sheet 7 (and the support coincides with the assumed position data of the supported spaces). In the present example, a rectangular planning space 23 is assumed to be applied to a corresponding rectangular shaped material sheet 7. Other shapes are possible as well.

The nesting plan 21 is created in a planning phase preceding the cutting process. For example, the controller of the flatbed machine tool may create the nesting plan, if, for example, currently recorded position data are included in the planning. Or an independent planning unit with corresponding computing capacity may create the nesting plan, if, for example, predetermined position data are assumed and these position data are then subsequently implemented for the cutting process on the basis of appropriate positioning of the material sheet on the pallet and the support bars. The generation of the nesting plan 21 can be a part of the manufacturing control system.

The nesting plan 21 shows an overlap-free arrangement of sub-spaces 9A-9F in the two-dimensional planning space 23, where the sub-spaces 9A-9F (also two-dimensional) correspond to six different types of workpieces. The nesting plan 21 concerns in this example the generation of 50 test workpieces.

The arrangement shown is based on an insertion sequence for the total of fifty sub-spaces. An insertion sequence generally determines the sequence in which the sub-spaces are inserted one after the other into the planning space 23 during a sequential generation of the nesting plan 21. The sub-spaces are arranged here, as an example, according to the bottom-left arrangement rule (strategy) in the planning space 23.

The nesting plan 21 also schematically shows a spatial arrangement of predetermined supported spaces 27. To clarify the origin of the supported spaces, the supported spaces are partially combined in lines, similar to the support bars, and are only shown as points in the area of the sub-spaces 9A-9F. As already mentioned, position data can be used, for example, in the evaluation of positions of the sub-spaces 9A-9F.

For illustration, additional cutting operation data and parameters are shown in an enlarged section of a corner of planning space 23. Each of the sub-spaces 9A-9F is bounded by one or more, in particular closed, contours. As an example, an outer contour 31A and an inner contour 31B are drawn for sub-space 9A (highlighted by dashes). For an outer contour 31A' of sub-space 9B, an insertion point E, an approach path A, and a pressure point D are also drawn.

The exemplary sub-spaces have different sizes, but are, e.g., all small enough for the gas pressure, e.g., caused by the laser cutting nozzle, to influence the stability of a sub-space. In the enlarged area of FIG. 2, one can see individual supported spaces 27 within the sub-space 9B. Together with the respective pressure point D and the respective center of gravity S of a sub-space, the supported spaces 27 define a susceptibility to tilting of a workpiece given by the sub-space 9B.

The nesting plan 21 shown in FIG. 2 is also based on a workpiece minimum distance. The workpiece minimum distance is determined, inter alia, by the material thickness of the material sheet to be cut, and the cutting parameters to be used. The workpiece minimum distance can be given at least between two adjacent sub-spaces 9A-9F arranged in the planning space 23. The workpiece minimum distance can lie, for example, in a range of 5 mm to 20 mm, e.g., 10 mm.

For the nesting procedures described below, one can use in general arrangement rules that define how sub-spaces in the planning space are arranged spatially one after the other. This is not limited to a bottom-left strategy, such as that underlying the exemplary nesting plans shown in the figures. Rather, bottom-left-fill strategies or no-fit-polygon approaches, for example, can also be used.

Figure 3:
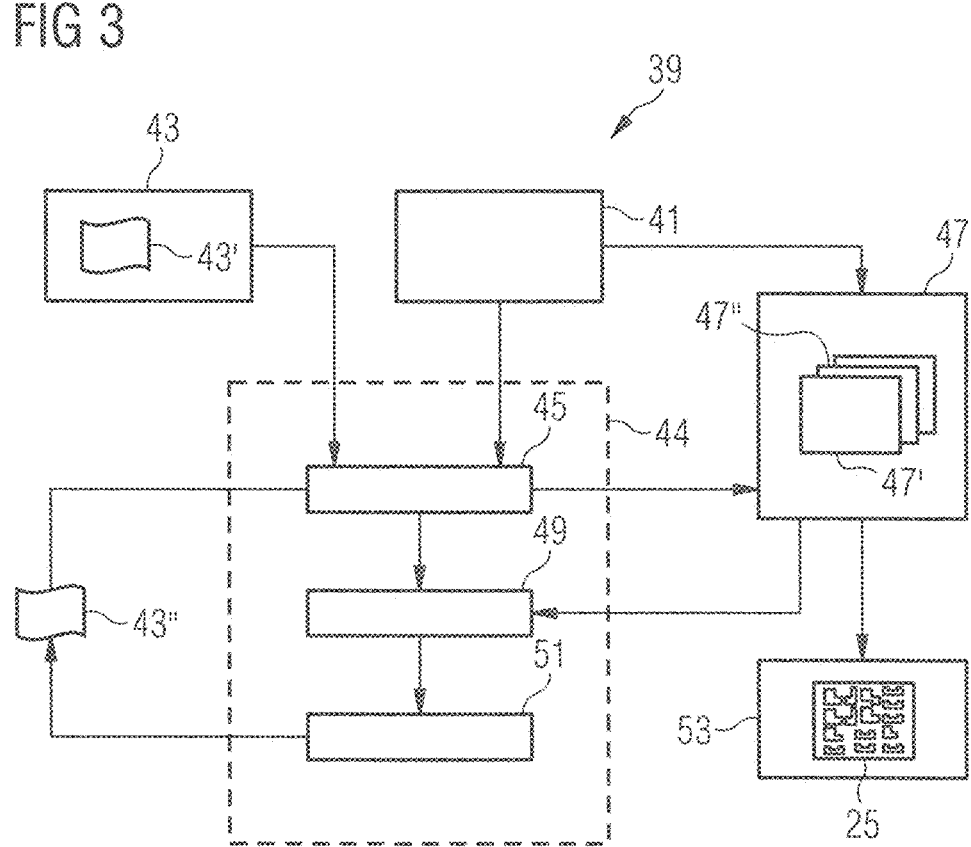
FIG. 3 is a flow diagram of a method for generating a nesting of sub-spaces for a control of a cutting process of a flatbed machine tool, as described herein.

With reference to the flow chart shown in FIG. 3 relating to a method 39 for nesting sub-spaces 9A-9F for control of a cutting process of a flatbed machine tool 1 for cutting out workpieces 9 from a material sheet 7, the nesting methods proposed herein generally assume that evaluation criteria exist for nesting, which can be implemented based on the representation of sub-spaces in the planning space. Evaluation criteria relate to, for example, overlaps of geometries, e.g., of the sub-spaces, but also possibly support spaces corresponding to the support of the material sheet. Evaluation criteria may also relate to angles with beam stop or the time required for laser cutting, taking heat effects into account. For feasible evaluation criteria, see also, for example, the German patent applications DE 10 2018 124 146 A1 and DE 10 2018 126 077 A1 mentioned at the beginning.

In a first step 41, evaluation criteria for a nesting are read in as a basis for the evaluation of nesting results.

In a step 43, sequence data 43' for a nesting is generated. Exemplary methods for this are also described in the German patent applications DE 10 2018 124 146 A1 and DE 10 2018 126 077 A1 mentioned at the beginning. Sequence data includes data that describes a complete nesting sequence. On the one hand, these are data that defines the contours of the sub-spaces, i.e., the workpiece shape. Sequence data can also include reference points of the sub-spaces, a sequence of cutting processes to be performed for a single sub-space and for all sub-spaces, and connecting paths between the cutting operations.

In a step 45, the sequence data 43' is evaluated within the frame of an evaluation algorithm 44 and evaluation data for the sequence data 43' is generated. The evaluation data relate to the evaluation criteria read in.

By, for example, comparing, forming a difference, forming ratios, calculating correlations, generally using combinatorial logic, of the evaluation data with the evaluation criteria, result data 47' is generated in step 47. The result data 47' may concern, for example, improvement parameters such as material efficiency, workpiece quality, and damage rate.

In a step 49, the evaluation algorithm 44 generates calculation data from the sequence data 43', the evaluation data, and the result data 47'. Calculation data is data used to improve the result of the nesting (i.e., the evaluation data and/or the result data). Calculation data is involved in the aggregation, herein generally understood as a reassembly of data sets using aggregation routines, as will be explained below for the evaluation algorithm 44.

Taking the calculation data into account, new sequence data 43" is generated in a step 51 using the evaluation algorithm 44. (It is noted that already step 43 for generating the (initial) sequence data 43' and/or step 47, i.e., generating result data, may be implemented as part of the evaluation algorithm 44.) The calculation data may, for example, be used in the generation of a new sequence of the sub-spaces 9A-9F to be arranged, may set new priorities in the evaluation, or may favor a specific sequence of cutting processes of individual or all sub-spaces 9A-9F.

For example, when generating evaluation data, calculation data, and/or further sequence data 43", the algorithm 44 including steps 45, 49, and 51 activates the execution of at least one data aggregation routine that aggregates a plurality of input data into output data. Data aggregation routines can themselves represent small algorithms/subroutines that link multiple data from multiple data types. Exemplary input data includes, for example, the sequence data read in by the evaluation algorithm, the evaluation data generated by the evaluation algorithm, the calculation data generated by the evaluation algorithm, the output data from the same data aggregation routine, and/or the output data from another data aggregation routine. The input data includes at least two of said data types. Thereby, in some embodiments, data aggregation routines can always be executed with the calculation data and at least one of the other mentioned data types of the input data. For example, the output data includes the sequence data generated by the evaluation algorithm, the evaluation data generated by the evaluation algorithm, and the calculation data generated by the evaluation algorithm.

In the evaluation algorithm 44, calculation data can be assigned to certain other input data of the data aggregation routines and can be linked to these, in particular multiplied with the same. In this way, it can be determined which input data can have an effect, in particular as positive as possible, on the result data and/or the evaluation data. If the calculation data assigned to these input data are then set such that the linking (multiplications) of the calculation data assigned to the input data results in the output data influencing the result, in particular as positively as possible, the result can be successively improved. At the same time, however, their influence on other evaluation data and/or result data can be determined and, if necessary, readjusted accordingly.

As indicated in FIG. 3, steps 45 to 51 are repeated several times and accordingly a plurality of result data 47', 47" is generated for a plurality of sequence data 43', 43". This can be continued until the result data exceeds a predetermined range with respect to the evaluation criteria or a maximum number.

From the sequence data 43" generated up to this point, an arrangement of sub-spaces to be implemented for the cutting process and an implementation of the cutting sequence as a result of the method for nesting sub-spaces is then derived in a step 53. This includes the cutting plan 25 that is to be used as a basis for the control of the flatbed machine tool for generating the workpieces corresponding to the sub-spaces.

In other words, the procedures described herein can be used to generate nesting results with a genetic algorithm, which is a randomized search algorithm developed to imitate the mechanics of natural selection and natural genetics. The efficiency of the nesting result can then be evaluated by an artificial neural network that includes an interconnected group of processing nodes and the evaluation result can be used to initiate the next evolutionary stage of the genetic algorithm. The procedure ends when predefined criteria (e.g., material efficiency) are reached. Thus, the process can loop between nesting and travel path improvement/optimization. This can be implemented as follows, for example:

In a first step, a genetic sequence is generated that represents a nesting result. For this purpose, (arrangement) rules (e.g., bottom-left placement) are applied to create initial nesting results with sufficient quality. In the first step, configuration parameters such as bar width can be specified, but this is purely optional.

In a second step, neural networks (e.g., Kohonen-feature-maps) are used to assess the quality of a nesting result. Here, the output neurons can be represented by the reference points of the parts (e.g., represented as a polygonal chain), whereby the connections of the output neurons are determined by anomalies (e.g., by overlaps of geometries, angles with beam stop, or the time duration that would be necessary for laser cutting considering heat effects).

In a third step, the output of the neural network is used to perform new sequencing of the gene sequence, which is then used in the genetic algorithm. Subsequently, a classification is again carried out by the neuronal network. The procedure is continued until the specified optimization parameters (such as material efficiency, quality, etc.) are met.

It is explicitly stated that all features disclosed in the description and/or the claims are intended to be disclosed separately and independently from each other for the purpose of original disclosure as well as for the purpose of restricting the claimed disclosure independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed disclosure, in particular as limits of value ranges.

What is claimed is:

1. A method for nesting sub-spaces arranged in a two-dimensional planning space and for controlling a cutting process of a flatbed machine tool, the method comprising:
    reading in evaluation criteria for an arrangement of nested sub-spaces, wherein the sub-spaces are delimited by contour lines in the two-dimensional planning space;
    generating sequence data for an arrangement of nested sub-spaces;
    performing a process comprising:
        generating evaluation data by evaluating the sequence data using an evaluation algorithm;
        generating result data based on a combinatorial logic of the evaluation data using the evaluation criteria;
        generating calculation data from the sequence data, the evaluation data, and the result data using the evaluation algorithm;
        generating further sequence data based on the calculation data using the evaluation algorithm; and
        repeating the process until the result data exceeds a specified range,
    wherein the evaluation algorithm executes at least a first data aggregation routine when generating evaluation data, calculation data, or the further sequence data, wherein the at least the first data aggregation routine
    i. when activated, aggregates multiple input data into output data;
    ii. wherein the input data includes at least two of the following data types:
        the sequence data read in by the evaluation algorithm,
        the evaluation data generated by the evaluation algorithm, the calculation data generated by the evaluation algorithm,
an output data of a second data aggregation routine, and
an output data of a data aggregation routine that was previously executed; and
iii. wherein the output data of the at least the first data aggregation routine influences at least one of the following data types:
the further sequence data generated by the evaluation algorithm,
the evaluation data generated by the evaluation algorithm, and
the calculation data generated by the evaluation algorithm; and
controlling a cutting process of a flatbed machine tool for cutting out a workpiece from a material sheet along at least one cutting line corresponding to the contour lines in the two-dimensional planning space based on the arrangement of the nested sub-spaces.

2. The method of claim 1, wherein the evaluation criteria comprise at least one of:
variables associated with the arrangement of sub-spaces, wherein the variables characterize an overlap of sub-spaces,
variables associated with relative angles of sections of the contour lines, which may trigger a beam stop during the cutting process, and/or
variables associated with a time duration, which is allocated to the cutting process based on heat effects; and
wherein the evaluation criteria are at least partially specified by a user or are specified alternatively or additionally at least partly by a control system.

3. The method of claim 2, wherein the evaluation data represents evaluations of variables associated with the evaluation criteria.

4. The method of claim 1, wherein the sequence data comprises data that describe a nesting sequence of the sub-spaces in the two-dimensional planning space that comprises a predetermined number of sub-spaces, wherein the data comprise contour lines of the sub-spaces and a cutting sequence of the contour lines of the sub-spaces.

5. The method of claim 1, wherein the result data comprises data that define an improvement parameter comprising a material efficiency of the arrangement of sub-spaces, and a quality of a workpiece generation; and
wherein the combinatorial logic comprises steps that perform one or more of a comparison, a formation of a difference, a formation of a ratio, and a formation of a correlation of the evaluation data with the evaluation criteria.

6. The method of claim 1, wherein the calculation data is associated with selected input data of the at least the first data aggregation routine and is linked with the selected input data; and
wherein the calculation data is adapted to improve the arrangement of nested sub-spaces.

7. The method of claim 6, wherein the calculation data indicates which of the input data have a positive effect on the result data and the evaluation data wherein a link between the calculation data and the input data causes the output data to positively influence the result data, and
wherein an influence of the calculation data on other evaluation data or other result data is determined.

8. The method of claim 1, wherein the evaluation algorithm executes the at least the first data aggregation routine a plurality of times comprising more than ten times, and thereby assigns at least one output data of the second data aggregation routine or of the data aggregation routine, which was previously executed, as the input data to the at least the first data aggregation routine.

9. The method of claim 1, wherein the at least the first data aggregation routine is adapted to link a plurality of data from a plurality of data types, or
wherein the input data comprises the calculation data generated by the evaluation algorithm,
and
wherein the at least the first data aggregation routine is adapted to link the calculation data with another data type.

10. A manufacturing system comprising:
a flatbed machine tool for cutting workpieces according to workpiece-specific cutting contours from a material sheet; and
a remote data processing system or a local manufacturing control system adapted to perform operations comprising:
reading in evaluation criteria for an arrangement of nested sub-spaces, wherein the sub-spaces are arranged in a two-dimensional planning space and are delimited by contour lines in the two-dimensional planning space, and wherein a sub-space is provided for controlling a cutting process of a flatbed machine tool for cutting out a workpiece from a material sheet along at least one cutting line corresponding to a contour line of the sub-space;
generating sequence data for an arrangement of nested sub-spaces;
performing a process comprising:
generating evaluation data by evaluating the sequence data using an evaluation algorithm
generating result data based on a combinatorial logic of the evaluation data using the evaluation criteria;
generating calculation data from the sequence data, the evaluation data, and the result data using the evaluation algorithm;
generating further sequence data taking into account the calculation data using the evaluation algorithm;
obtaining a final arrangement of the nested sub-spaces based on the further sequence data by repeating the process until the result data exceeds a specified range; and
controlling the cutting process of the flatbed machine tool for cutting out the workpiece from the material sheet along at least one cutting line corresponding to the contour lines in the two-dimensional planning space based on the final arrangement of the nested sub-spaces,
wherein the evaluation algorithm executes at least a first data aggregation routine when generating evaluation data, calculation data, and the further sequence data, the at least the first data aggregation routine when activated, aggregates input data into output data;
wherein the input data comprises two or more of:
the further sequence data read in by the evaluation algorithm,
the evaluation data generated by the evaluation algorithm,
the calculation data generated by the evaluation algorithm,
an output data of a second data aggregation routine, and an output data of a first data aggregation routine that was previously executed; and wherein the output data of the at least the first data aggregation routine influences at least one of the following data types:

the sequence data generated by the evaluation algorithm, the evaluation data generated by the evaluation algorithm, and the calculation data generated by the evaluation algorithm.

11. The manufacturing system of claim 10, wherein the remote data processing system comprises a calculation, control, and storage device, and wherein the evaluation data or the result data are generated, anonymized for a plurality of sequence data, and stored.

12. The manufacturing system of claim 10, wherein the flatbed machine tool is configured for processing flat, bending-resistant, objects comprising sheet metal sheets, and the flatbed machine tool is configured as a laser processing machine tool comprising a laser cutting machine tool.

13. The manufacturing system of claim 10, wherein the evaluation criteria comprise at least one of:

variables associated with the arrangement of sub-spaces, and the variables characterize an overlap of sub-spaces, relative angles of sections of the contour lines, which may trigger a beam stop during the cutting process, and a time duration, which is allocated to the cutting process based on heat effects; and wherein the evaluation criteria are at least partially specified by a user or are specified alternatively or additionally at least partly by a control system.

14. The manufacturing system of claim 10, wherein the sequence data comprises data, which describe a nesting sequence of the sub-spaces in the two-dimensional planning space that comprises a predetermined number of sub-spaces, wherein the data comprise contour lines of the sub-spaces and a cutting sequence of the contour lines of the sub-spaces.

15. The manufacturing system of claim 14, wherein the evaluation data represents evaluations of variables associated with the evaluation criteria.

16. The manufacturing system of claim 10, wherein the result data comprises data, which define an improvement parameter comprising a material efficiency of the arrangement of sub-spaces, and a quality of a workpiece generation; and wherein the combinatorial logic comprises steps that perform one or more of a comparison, a formation of a difference, a formation of a ratio, and a formation of a correlation of the evaluation data with the evaluation criteria.

17. The manufacturing system of claim 10, wherein the calculation data is associated with selected input data of the at least one data aggregation routine and are linked with the selected input data; and wherein the calculation data is adapted to improve the arrangement of nested sub-spaces.

18. The manufacturing system of claim 17, wherein the calculation data indicates which of the input data have a positive effect on the result data and the evaluation data wherein a link between the calculation data and the input data causes the output data to positively influence the result data, and wherein an influence of the calculation data on other evaluation data or other result data is determined.

19. The manufacturing system of claim 10, wherein the evaluation algorithm executes the at least the first data aggregation routine a plurality of times comprising more than ten times, and thereby assigns at least one output data of the second another data aggregation routine or of the data aggregation routine, which was previously executed, as the input data to the at least the first data aggregation routine.

* * * * *